(12) United States Patent
Wohllaib (10) Patent No.: US 8,783,033 B2
(45) Date of Patent: Jul. 22, 2014

(54) WIND- AND RADIATION-ENERGY COLLECTOR SYSTEM

(75) Inventor: Karl Wohllaib, Erolzheim (DE)

(73) Assignee: Karl Wohllaib GmbH, Erolzheim (DE)

( * ) Notice: Subject to any disclaimer, the term of this patent is extended or adjusted under 35 U.S.C. 154(b) by 46 days.

(21) Appl. No.: 13/640,215

(22) PCT Filed: Apr. 11, 2011

(86) PCT No.: PCT/DE2011/000384
§ 371 (c)(1),
(2), (4) Date: Oct. 9, 2012

(87) PCT Pub. No.: WO2011/124217
PCT Pub. Date: Oct. 13, 2011

(65) Prior Publication Data
US 2013/0025280 A1    Jan. 31, 2013

(30) Foreign Application Priority Data

Apr. 9, 2010   (DE) .......................... 10 2010 014 300

(51) Int. Cl.
*F03D 9/00* (2006.01)
*F03G 6/00* (2006.01)

(52) U.S. Cl.
CPC ..................................... *F03D 9/007* (2013.01)
USPC ......................................... 60/641.8; 290/55

(58) Field of Classification Search
CPC ..................................................... F03D 9/007
USPC ................... 60/641.8–641.9, 641.11–641.15; 290/44, 55

See application file for complete search history.

(56) References Cited

U.S. PATENT DOCUMENTS

| 2006/0260672 | A1  |   | 11/2006 | Niederer |         |
|--------------|-----|---|---------|----------|---------|
| 2009/0146434 | A1  |   | 6/2009  | Fernandez |        |
| 2010/0107633 | A1  | * | 5/2010  | Tsao ............................ | 60/641.8 |
| 2010/0133820 | A1  | * | 6/2010  | Tsao .............................. | 290/44 |
| 2010/0183443 | A1  | * | 7/2010  | Thorne ..................... | 416/146 R |

FOREIGN PATENT DOCUMENTS

| DE | 299 18 740 U1 |   | 5/2000 |
|----|---------------|---|--------|
| EP | 0761965 A1    | * | 3/1997 |
| WO | 00/55549 A1   |   | 9/2000 |

\* cited by examiner

*Primary Examiner* — Thomas Denion
*Assistant Examiner* — Mickey France
(74) *Attorney, Agent, or Firm* — Laurence A. Greenberg; Werner H. Stemer; Ralph E. Locher

(57) ABSTRACT

A wind-energy and radiation-energy collector system has at least one radiation-energy collector with a radiation-absorbing absorber and a reflector element. The reflector element collects radiation and directs the radiation at the absorber. At least one wind wheel, which is arranged in a direction opposite the receiving direction of the radiation-energy collector and which is supported on the system, is provided. The arrangement of the radiation-energy collector and the wind wheel is movably supported so that the arrangement can be oriented either with the radiation-energy collector facing the sun or with the wind wheel against the prevailing wind direction.

6 Claims, 11 Drawing Sheets

WIND- AND RADIATION-ENERGY COLLECTOR SYSTEM

BACKGROUND OF THE INVENTION

Field of the Invention

The invention relates to a wind- and radiation-energy collector for using renewable energies according to the respectively optimum use situation.

Demand for use of renewable energies is on the increase. However, the use of solar energy and wind energy using collectors on relatively small buildings or estates is possible with the systems in existence to an insufficient degree.

In particular, there is a lack of systems that can be set flexibly to changing conditions. Utilization of solar energy and wind energy is preferably necessary by way of rapid change within the process conditions in a system.

BRIEF SUMMARY OF THE INVENTION

It is therefore an object of the invention to provide a wind- and radiation-energy collector, which can convert the radiation energy of the sun and wind energy into usable energy.

This object is achieved by a wind- and radiation-energy collector system according to the features of the claims.

The invention proposes to configure a wind- and radiation-energy collector system, in which at least one radiation-energy collector, which has a radiation-absorbing absorber and a reflector body and which collects radiation and directs it onto the absorber, is provided, in a manner such that at least one wind wheel, which is mounted on the system and arranged opposite the receiving direction of the radiation-energy collector, is provided, wherein the arrangement of radiation-energy collector and wind wheel is moveably supported, so that the arrangement can be orientated either with the radiation-energy collector toward the sun or with the wind wheel toward the prevailing wind direction.

For the purposes of the invention, wind wheel also comprises a wind capturing apparatus which is configured and/or supported in a roller-type fashion.

One of the major advantages, among others, is that the orientation mechanics and orientation drives can be used for collectors for both energy types together and have to be provided only once. In addition, the system can be configured to be substantially more compact than conventional systems that can only be set up one next to the other.

One advantageous embodiment of the invention provides for a fluid to flow through the absorber of the radiation-energy collector, which fluid acquires the absorbed radiation that has been converted into heat.

The kinetic energy of the wind wheel preferably acts on a generator.

One preferred embodiment of the invention provides for the hollow space to taper toward its end and narrow in particular in cross section in the shape of a bell, cone or a truncated cone.

A particularly advantageous embodiment of the invention provides for the reflector body to be formed by individually pivotable and/or displaceable partial surfaces which are articulated on the starting region of the reflector body, whereby the ends of the partial surfaces that point toward the bottom of the radiation-energy collector can be pivoted and/or displaced toward the outside, as a result of which a wind channel that follows the wind wheel is formed.

As a result, wind can flow through the arrangement for wind utilization in an optimum fashion because the reflector body is folded toward the outside to form a tube-shaped structure for collecting radiation.

According to a further development, provision may subsequently be made for the partial surfaces of the reflector body to be capable of being pivoted inwardly into the space of the wind channel such that the reflector body forms a tapering hollow space that reflects the radiation on its surface, with the absorber being arranged at its narrowing bottom.

Provision is advantageously made for a plurality of arrangements of successive wind wheels and collectors with reflector bodies and absorbers to be arranged in parallel next to one another.

One particularly advantageous embodiment of the invention provides for a frame to be provided to support the arrangement(s), on which frame the arrangement is suspended moveably and in particular such that it is rotatable about the vertical and is tiltable about a horizontal tilt axis. As a result, the arrangement can, in a particularly simple manner, be oriented toward the renewable energy form to be utilized here, and perfect orientation toward the wind direction or the position of the sun is possible.

At least one coupling, using which the wind wheel can be separated from the generator, can be advantageous. Hereby, unnecessary friction losses in components which are not involved in the current process are precluded.

One advantageous embodiment of the invention provides for a plurality of linear radiation collectors and wind wheel arrangements to be combined such that they are parallel. Hereby, standardized and optimized units can be developed cost-effectively to the respective power stage.

One further embodiment provides for laterally articulated solar panels to be provided, whose rear-facing surfaces can also be adjusted such that they direct the wind onto the wind wheel(s).

Further advantageous embodiments result from the further dependent claims or their possible subcombinations.

The invention will be explained in further detail below with reference to the drawings. Specifically, the schematic illustration shows in.

BRIEF DESCRIPTION OF THE SEVERAL VIEWS OF THE DRAWING

DESCRIPTION OF THE INVENTION

The reference numerals which are identical in the figures designate identical elements or elements with the same action.

Figure 1:
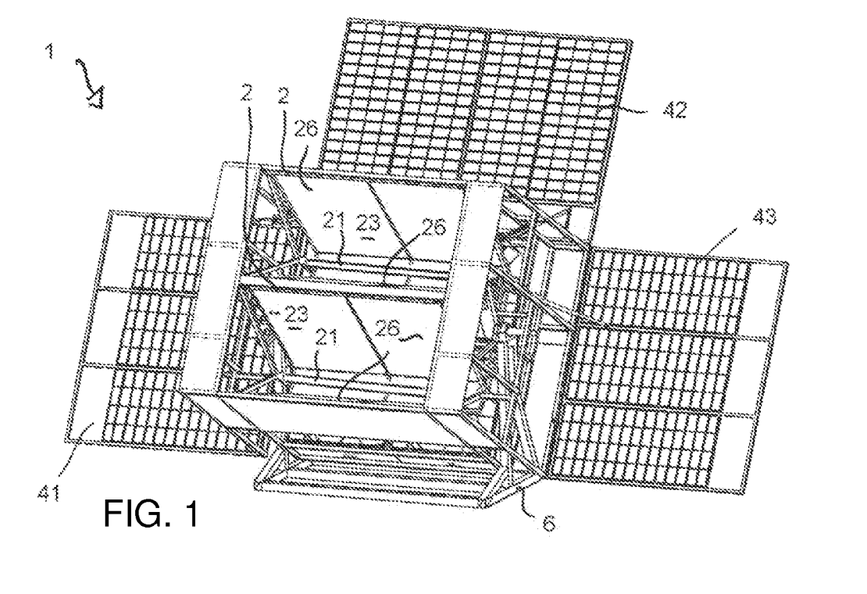
FIG. 1 a schematic illustration of an arrangement of wind- and radiation-energy collector according to the invention in a system in radiation-energy collector mode of operation, orientated with the radiation-energy collector toward the sun, FIG. 2 a schematic illustration of the wind- and radiation-energy collector system from FIG. 1 with another orientation angle with respect to the sun, FIG. 3 a schematic illustration of the wind- and radiation-energy collector system from FIG. 2 viewed from the side, FIG. 4 a schematic illustration of the wind- and radiation-energy collector system from FIG. 2 viewed at an angle from behind, FIG. 5 a schematic illustration of the wind- and radiation-energy collector system from FIG. 2 viewed from the front into the collector, FIG. 6 a schematic illustration of the wind- and radiation-energy collector system from FIGS. 1 to 5, wherein the solar panels lay flat, FIG. 7 a schematic illustration of the wind- and radiation-energy collector system from FIG. 6 viewed from the front into the collector, FIG. 8 a schematic illustration of the wind- and radiation-energy collector system from FIG. 6 in the wind-energy collector mode of operation with reflector partial bodies folded out of the wind channel, orientated with the wind-energy collector toward the wind, FIG. 9 a schematic illustration of the wind- and radiation-energy collector system from FIG. 8 viewed from the front into the wind channel onto the wind wheels, FIG. 10 a schematic illustration of the wind- and radiation-energy collector system from FIG. 8 viewed at an angle from behind, FIG. 11 a schematic illustration of the wind- and radiation-energy collector system from FIG. 8 viewed from the side, FIG. 12 a schematic illustration of the wind- and radiation-energy collector system from FIG. 8 with solar panels that are folded out so as to guide wind and auxiliary surfaces, FIG. 13 a schematic illustration of the wind- and radiation-energy collector system from FIG. 12 viewed at an angle, FIG. 14 a schematic illustration of the wind- and radiation-energy collector system from FIG. 12 in opened side view with reflector partial surfaces folded away, FIG. 15 a schematic illustration of the wind- and radiation-energy collector system from FIG. 2 in opened side view with inwardly pivoted reflector partial surfaces for forming the reflector body, FIG. 16 a schematic illustration of the wind- and radiation-energy collector system with wind rollers as wind wheels viewed at an angle from the front, FIG. 17 a schematic illustration of the wind- and radiation-energy collector system from FIG. 16 viewed at an angle from behind, FIG. 18 a schematic illustration of a wind- and radiation-energy collector system according to the invention integrated into a sloping surface which is rotatable about the vertical axis, FIG. 19 a schematic illustration of the wind- and radiation-energy collector system from FIG. 18 viewed at an angle from behind, FIG. 20 a schematic illustration of the wind- and radiation-energy collector system from FIG. 18 in a side view, FIG. 21 a schematic illustration of the wind- and radiation-energy collector system from FIG. 18 viewed from behind, and FIG. 22 a schematic illustration of the wind- and radiation-energy collector system from FIG. 18 in a view from above.

FIG. 1 shows an exemplary a schematic illustration of an arrangement of wind- and radiation-energy collector system 1 according to the invention, which is orientated toward the sun. The wind wheel 3, which cannot be seen in the figure, is arranged opposite in the receiving direction of the radiation-energy collector 2. A plurality of arrangements (2 and 3) of successive wind wheels 3 and collectors 2 with reflector bodies 22 and absorbers 21 are arranged in parallel next to one another.

For solar energy, a radiation-energy collector 2 is provided having a radiation-absorbing absorber 21 and a reflector body 22 which collects radiation and directs it onto the absorber 21.

The reflector body 22 forms a tapering hollow space 24, which reflects the radiation at its surface 23 and on whose narrowing bottom 25 the absorber 21 is arranged. The radiation is directed in an optimum fashion onto the absorber 21 at the bottom 25 of the radiation-energy collector 2.

A fluid, which circulates through the absorber 21 and acquires the absorbed radiation that has been converted into heat, is guided via a line system to a heat exchanger (not shown).

In addition, solar panels 41, 42, 43, which are laterally articulated in the example shown, are folded out such that electric energy can be obtained in an optimum fashion with the system 1 that is orientated toward the sun.

The entire arrangement is moveably supported by a frame 6, by means of which the orientation in the example can occur by tilting with respect to the position of the sun/direction of the wind.

Figure 2:
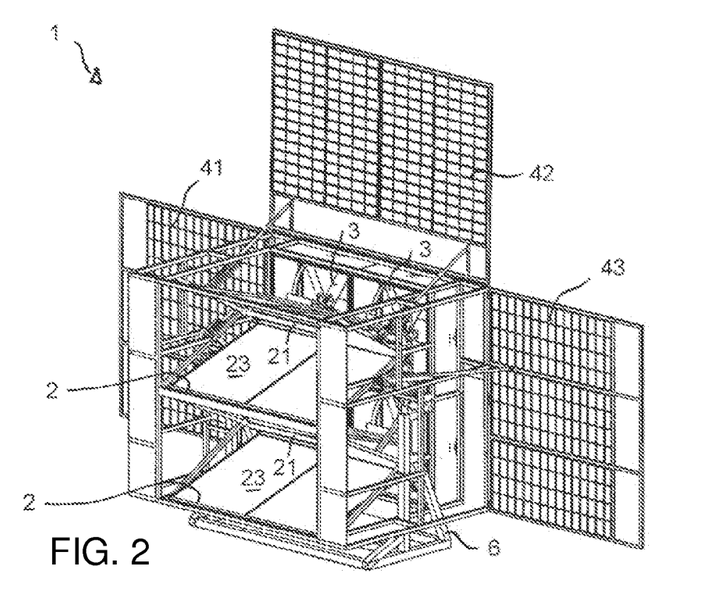

FIG. 2 shows the same system in a slightly modified orientation, for example in the morning.

Figure 3:
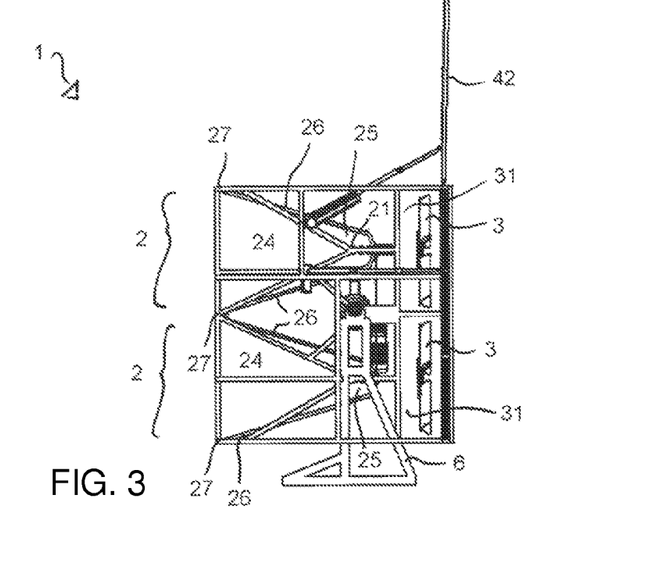

FIG. 3 shows the system from the side, wherein the reflector body 22, which tapers toward the bottom 25, can be clearly seen. This view also shows the axial arrangement of the radiation-energy collector 2 and of the wind wheel 3 in each case for the parallel arrangements.

For example, depending on the environmental conditions, the arrangement can be orientated either with the radiation-energy collector 2 toward the sun or with the wind wheel 3 toward the prevailing wind direction so as to be able to provide electric energy in an optimum fashion.

Figure 4:
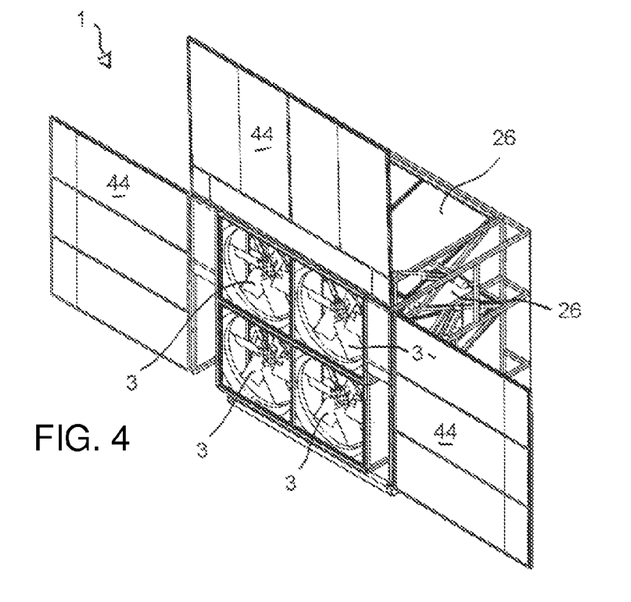
Figure 5:
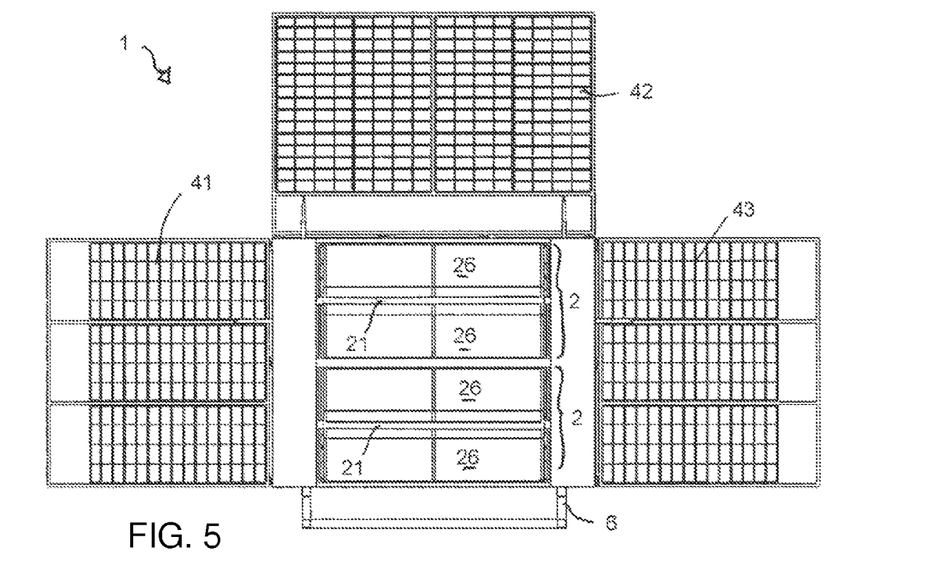

FIG. 4 shows again a wind- and radiation-energy collector system, this time at an angle from behind, with view onto the wind wheels 3 which are deactivated in this mode of operation. FIG. 5 shows a front view.

Figure 6:
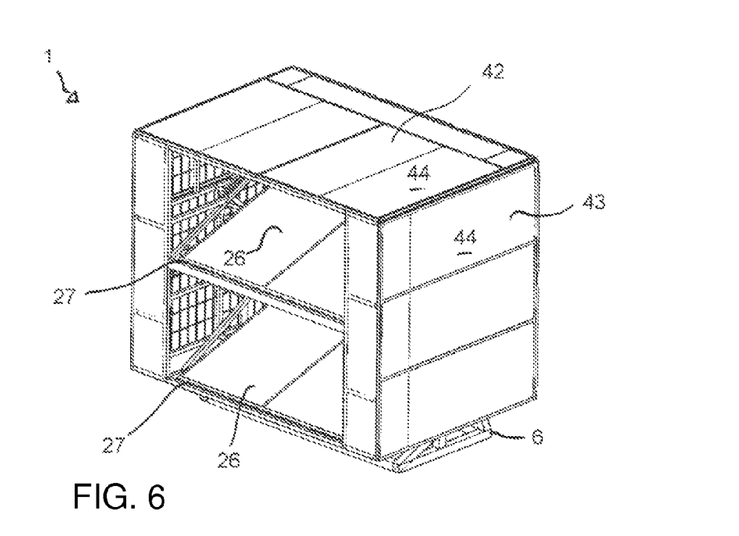

At unfavourable relatively strong wind conditions, a mode of operation as shown in FIG. 6 is possible, where the solar panels 41, 42 and 43 lie flat.

Figure 7:
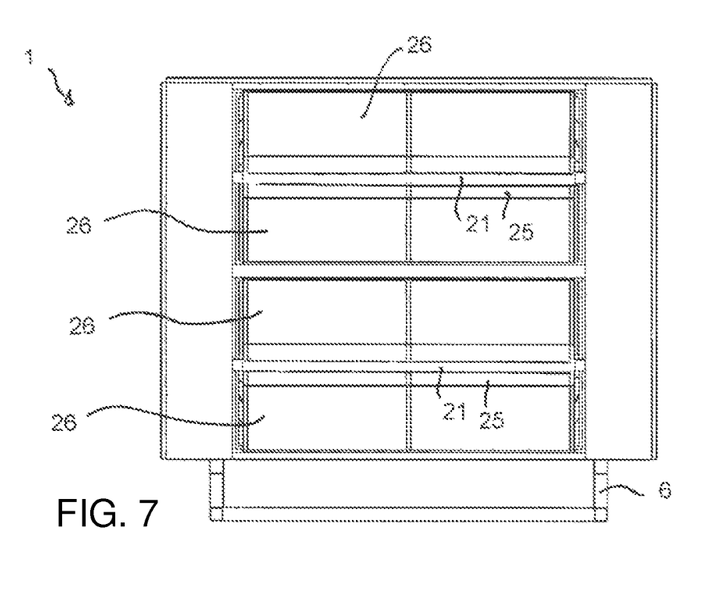

FIG. 7 shows accordingly a view from the front into the collector.

Figure 8:
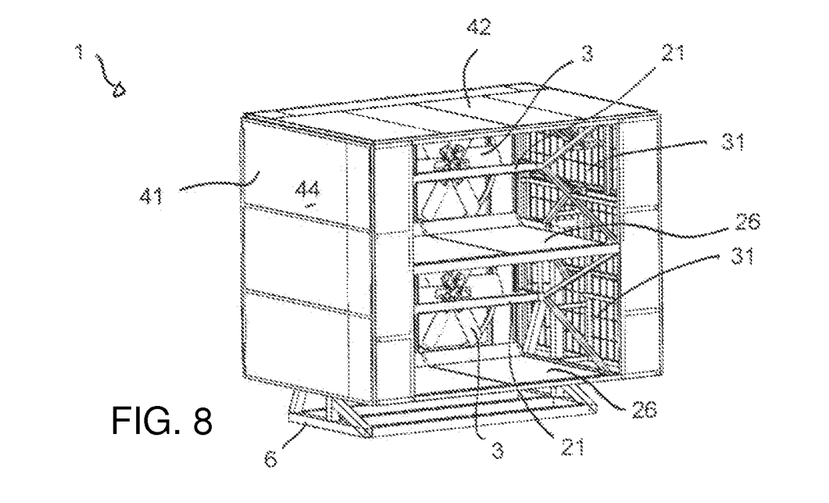

For wind utilization, the wind- and radiation-energy collector system, as shown in FIG. 8, was changed into the wind-energy collector mode of operation by folding the reflector partial surfaces 26 out of the wind channel 31 so as to enable optimum operation of the wind wheel 3, wherein the partial surfaces 26 which are pivoted toward the outside partially form the walls of the wind channel. Orientation now takes place with the wind-energy collector toward the wind.

Figure 9:
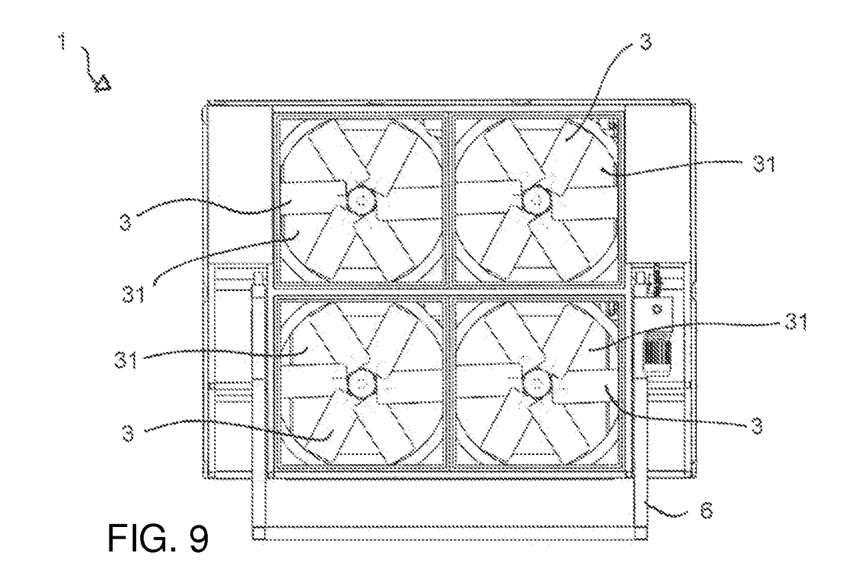
Figure 10:
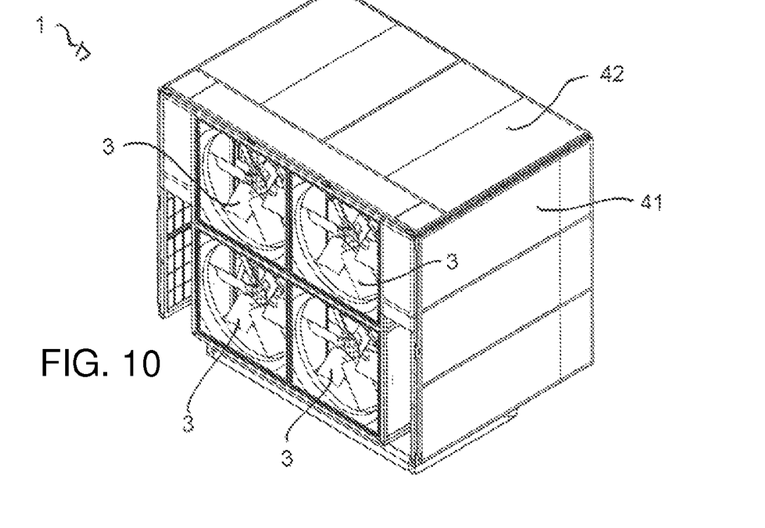
Figure 11:
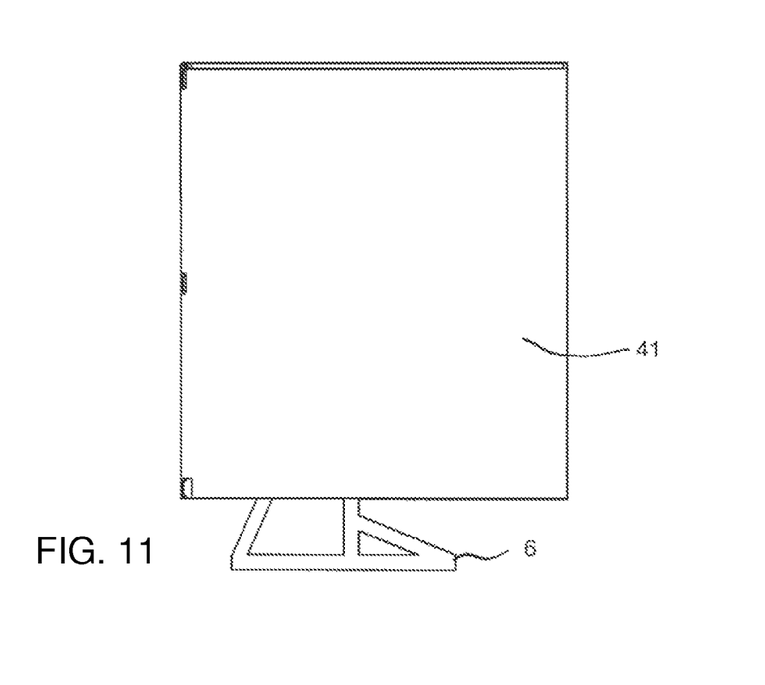

FIG. 9 shows a schematic illustration of the wind- and radiation-energy collector system from FIG. 8 viewed from the front into the wind channel 31 onto the wind wheels. FIG. 10 shows the system 1 viewed at an angle from above and FIG. 11 from the side.

Figure 12:
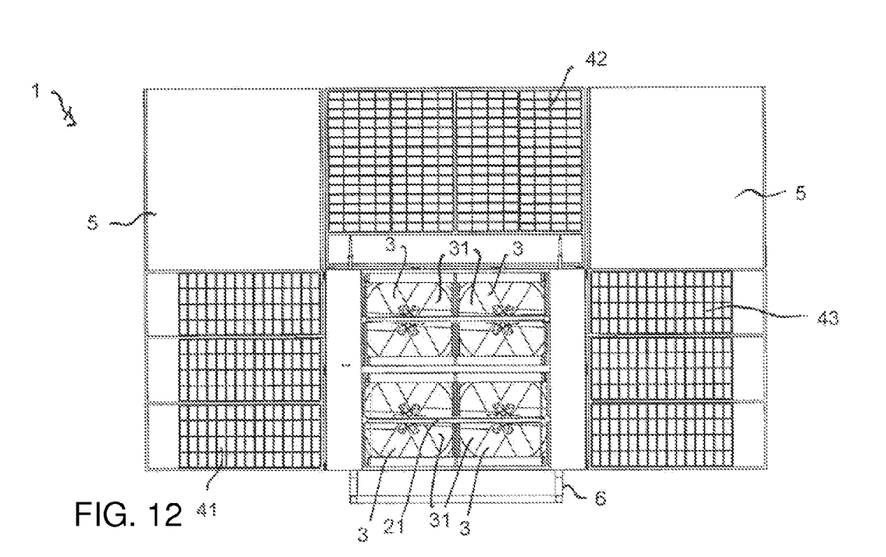
Figure 13:
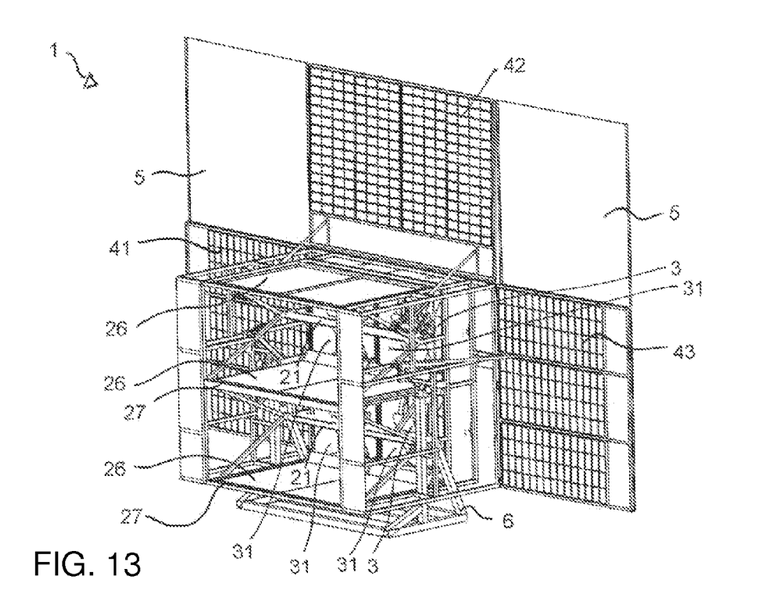

FIGS. 12 and 13 show the wind- and radiation-energy collector system 1 from FIG. 8 with solar panels 41, 42 and 43, which are folded out for wind guidance, and in addition auxiliary surfaces 5, which are folded out.

Figure 14:
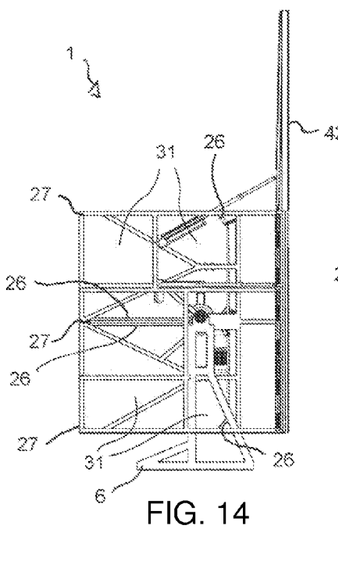
Figure 15:
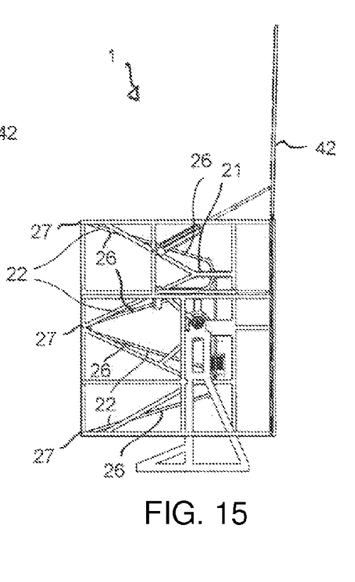

FIGS. 14 and 15 show, comparatively clearly, an opened side view of the different modes of operation of the reflector body by partial surfaces being pivoted in and away. FIG. 14 shows the mode of operation wind-energy collector with the reflector partial surfaces 26 being folded away to form the wind channel 31; FIG. 15 shows the mode of operation radiation-energy collector with reflector partial surfaces 26 folded inwardly to form the reflector body 22.

Figure 16:
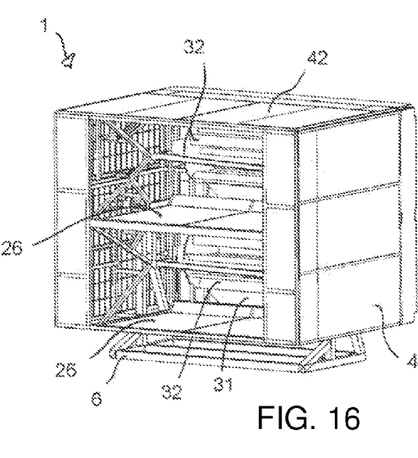
Figure 17:
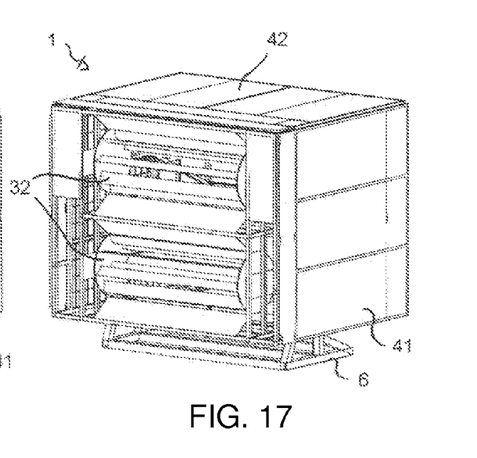

FIGS. 16 and 17 show, viewed at an angle from the front and the rear, a variant of the wind- and radiation-energy collector system 1, in which the wind wheels are configured in the form of wind rollers 32, which are supported at the sides.

FIGS. 18 to 22 show, in various views, a schematic illustration of a wind- and radiation-energy collector system 1 according to the invention integrated in a sloping surface 7 which is rotatable about the vertical axis. In the example shown, the sloping surface is configured in a manner so as to be rotatable about its axis. The assembly of the wind- and radiation-energy collector system 1 can be pivoted in the sloping surface 7 about the horizontal axis. For the wind-energy collector mode of operation, the side having the wind wheels 3 is orientated toward the wind (FIG. 17).

Figure 18:
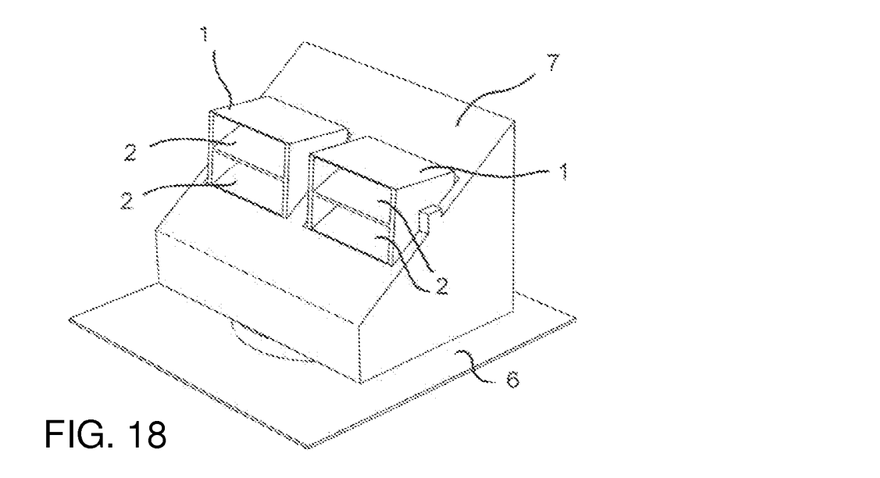
Figure 19:
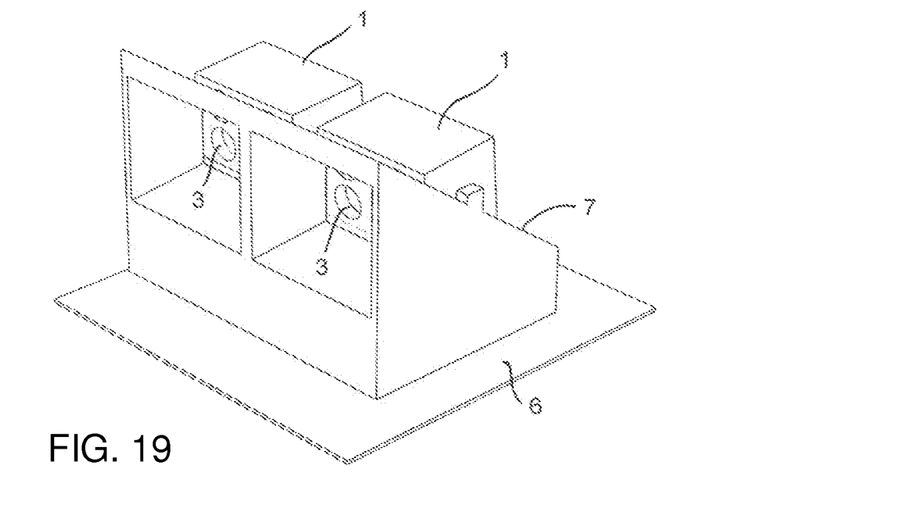
Figure 20:
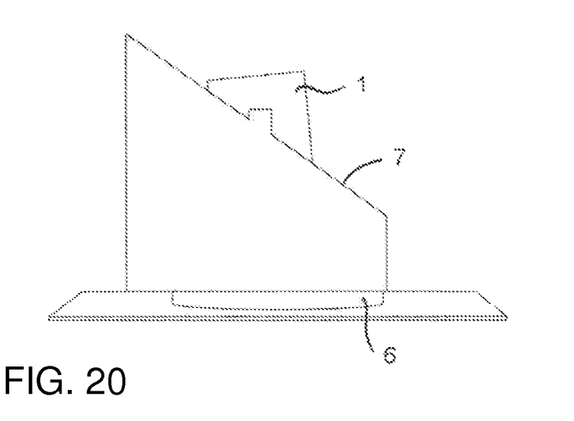
Figure 21:
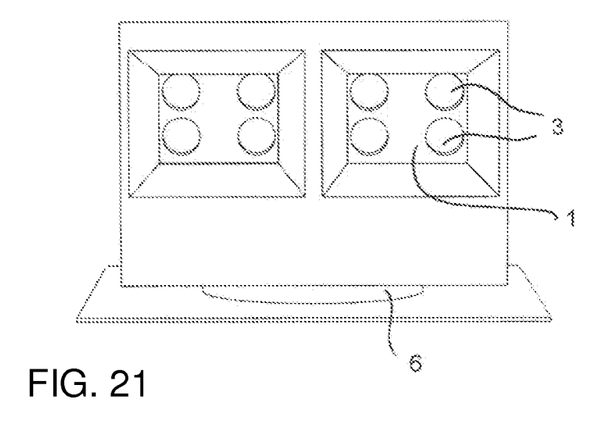
Figure 22:
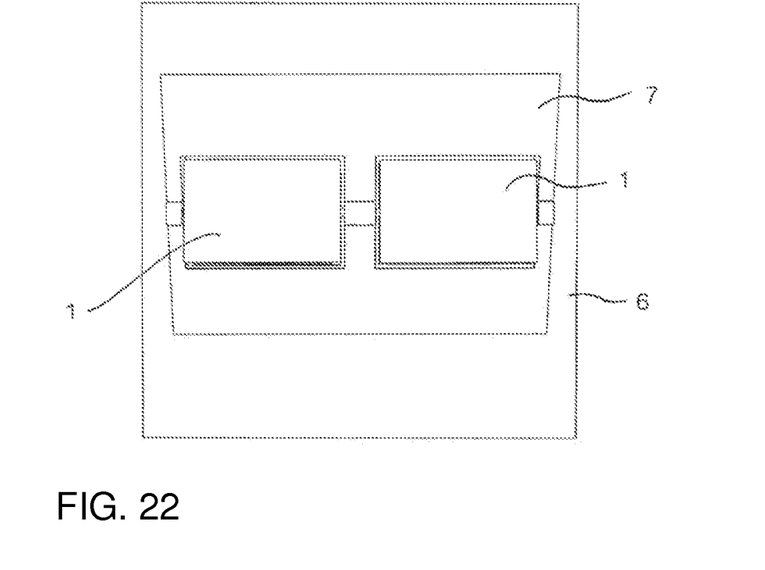

Other solar panels can also be mounted on the sloping surface 7, with the result that the surface is utilized to an optimum extent.

The wind- and radiation-energy collector system can be provided individually or in the combined parallelized form for mounting on a vehicle, a container or on a house roof.

LIST OF REFERENCES

1 wind- and radiation-energy collector system
2 radiation-energy collector
21 absorber
22 reflector body
23 surface
24 hollow space
25 bottom
26 partial surfaces
27 starting region
3 wind wheel
31 wind channel
32 wind roller
41 solar panel
42 solar panel
43 solar panel
44 rear-facing surface
5 auxiliary surface
6 frame
7 sloping surface

The invention claimed is:

1. A wind-energy and radiation-energy collector system, comprising:
at least one radiation-energy collector having a radiation-absorbing absorber and a reflector body, said reflector body collecting radiation and directing the radiation onto said absorber;
at least one wind wheel mounted on the collector system and disposed opposite a receiving direction of said radiation-energy collector;
said radiation-energy collector and said wind wheel defining a configuration being moveably supported so that said configuration is capable of being orientated either with said radiation-energy collector toward a sun or with said wind wheel toward a prevailing wind direction; and
said reflector body being formed of individually pivotable and/or individually displaceable partial surfaces articulated on a starting region of said reflector body, whereby said partial surfaces have ends pointing toward a bottom of said radiation-energy collector and can be one of pivoted or displaced toward an outside of the collector system, forming a wind channel that follows said wind wheel.

2. The wind-energy and radiation-energy collector system according to claim 1, wherein:
said bottom is a narrowing bottom; and
said partial surfaces of said reflector body are capable of being pivoted inwardly into a space of said wind channel such that said reflector body forms a tapering hollow space that reflects the radiation on a surface, with said absorber being disposed at said narrowing bottom.

3. The wind-energy and radiation-energy collector system according to claim 1, wherein:
said at least one radiation-energy collector is one of a plurality of radiation-energy collectors;
said at least one wind wheel is one of a plurality of wind wheels; and
said configuration is one of a plurality of configurations of successive said wind wheels and said radiation-energy collectors with said reflector bodies and said absorbers being disposed in parallel next to one another.

4. The wind-energy and radiation-energy collector system according to claim 3, further comprising a frame for supporting said configurations, on which said frame each of said configurations is suspended moveably, rotatable about a vertical axis and tiltable about a horizontal tilt axis.

5. The wind-energy and radiation-energy collector system according to claim 1, further comprising articulated solar panels having rear-facing surfaces that can be adjusted for directing wind onto said wind wheel.

6. The wind-energy and radiation-energy collector system according to claim 1, wherein said wind wheel is configured as a wind roller.

* * * * *